Nov. 20, 1962  G. R. DEMPSTER ET AL  3,064,834
TRANSPORTING EQUIPMENT
Filed July 23, 1958  3 Sheets-Sheet 3

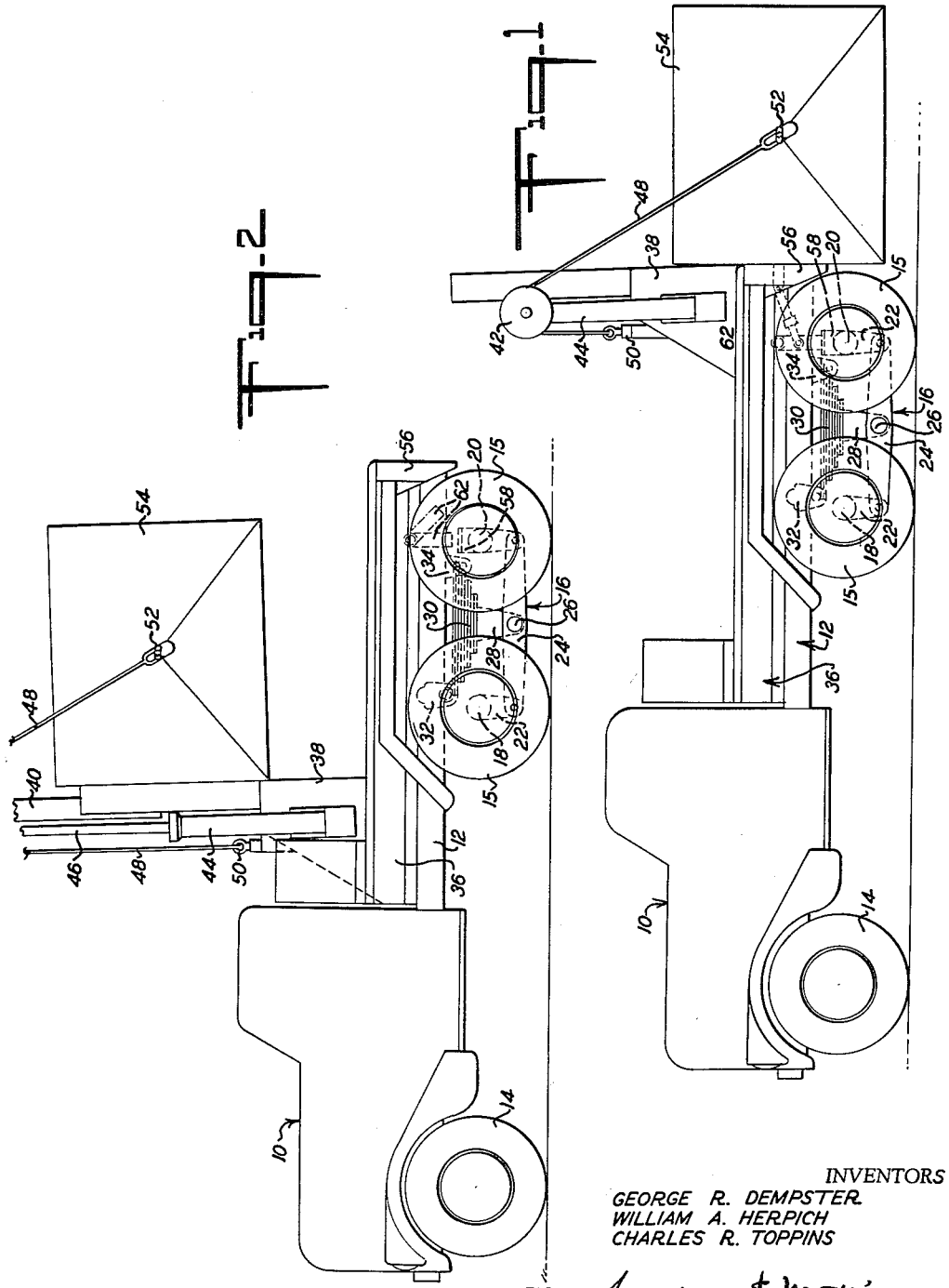

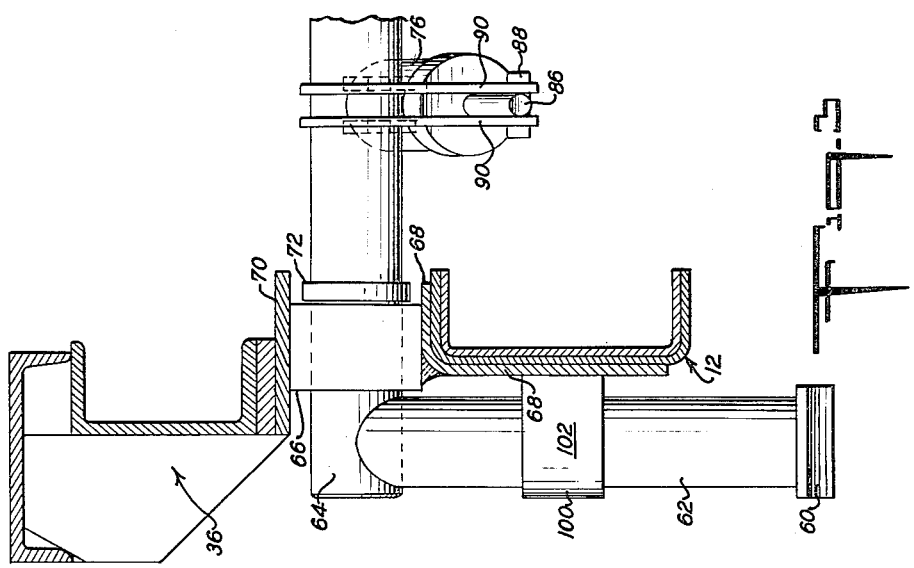
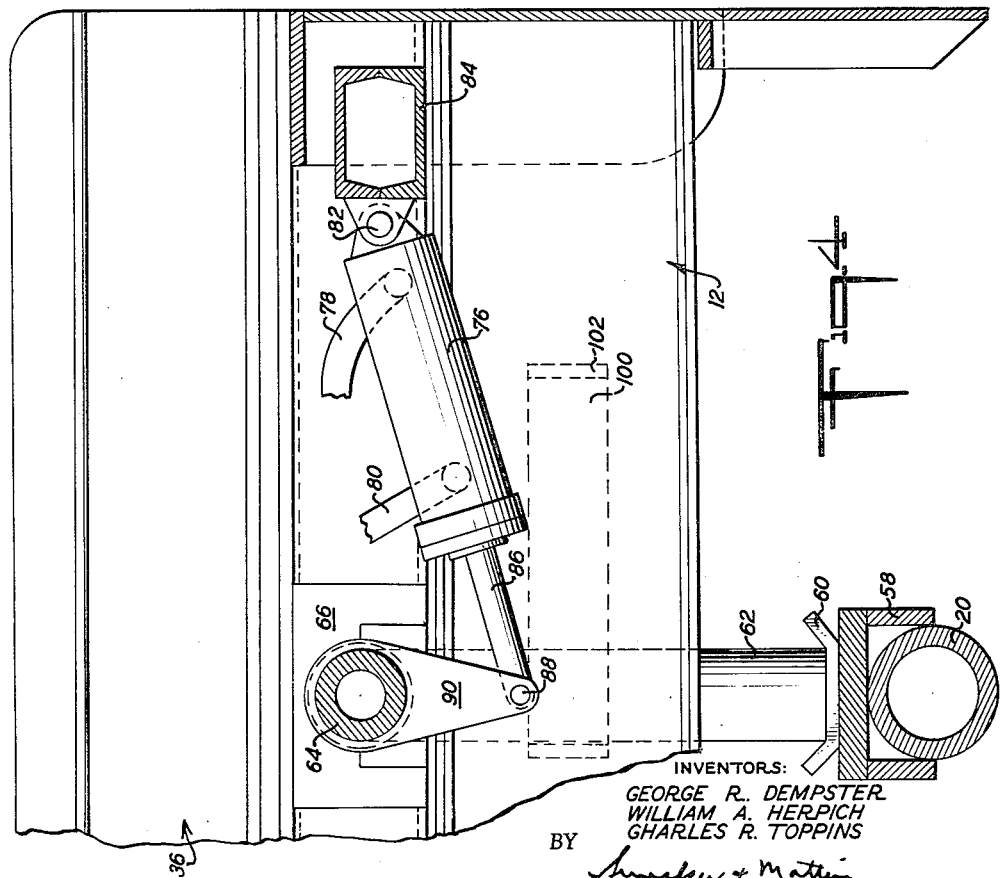

INVENTORS
GEORGE R. DEMPSTER
WILLIAM A. HERPICH
CHARLES R. TOPPINS
BY
ATTORNEYS

United States Patent Office 3,064,834
Patented Nov. 20, 1962

3,064,834
TRANSPORTING EQUIPMENT
George R. Dempster, William A. Herpich, and Charles R. Toppins, Knoxville, Tenn., assignors to Dempster Brothers, Inc., Knoxville, Tenn., a corporation of Tennessee
Filed July 23, 1958, Ser. No. 750,499
3 Claims. (Cl. 214—75)

This invention relates to improvements in transporting equipment and, more particularly, to means for stabilizing tandem axle vehicles during periods when heavy loads are imposed upon the end portion thereof in such a manner that there is a tendency for the opposite end of the vehicle to tilt upwardly off the ground.

Although the invention may be employed advantageously in connection with tandem axle vehicles of various types, it is particularly desirable when applied to a tandem axle truck chassis having mounted thereon a hoisting mechanism for detachable containers. Dempster Patent No. 2,179,779, granted Nov. 14, 1939, Dempster Patent No. Re. 23,546, granted Sept. 9, 1952, and Jones Patent No. 2,800,233, granted July 23, 1957, disclose transporting equipment of this general type, and reference to these patents should be made in order to obtain a complete understanding of the manner in which such equipment is used.

Transporting equipment of the type disclosed in the above-mentioned patents includes a truck chassis having front and rear wheels, a frame fixed to the truck chassis rearwardly of the cab of the truck, a longitudinally reciprocable carriage mounted upon such frame, and a hoisting mechanism. When it is desired to load a detachable container onto the truck, the truck is maneuvered into a position such that the container is disposed immediately in back of the truck chassis, the hoisting mechanism is connected to the container and operated to lift the container to a level above that of the frame, and then the carriage is moved forwardly along the truck chassis to bring the loaded container to a position in front of the rear axle. Container dumping and discharging operations are similar, in the sense that they too require that the container be supported adjacent the rear end of the truck during an interval of time.

The trucks illustrated in the drawings of prior patents have only a single rear axle. With trucks of this type, the rear axle may be disposed fairly close to the rear end of the truck chassis. However, many users of container-handling equipment prefer tandem axle trucks. A typical tandem axle arrangement materially reduces the load carried by each axle and results in a number of operating advantages.

In a conventional tandem axle installation, a walking beam is employed to connect the two axles together, and the truck chassis is connected to a central portion of the walking beam so that the load will be transmitted to both of the axles. Hence, it will be seen that the actual support point for the vehicle chassis is located approximately midway between the two rear axles, rather than at the rearmost axle itself. In other words, the distance between the rear end of the truck chassis and the normal rearmost line of support for the chassis in a tandem axle truck is necessarily greater than the distance between the rear end of the chassis and the rear axle of a single axle truck.

The problem presented by this forward shift in the rearmost line of support for the truck chassis can be understood readily when one considers the distribution of the forces imposed upon the truck chassis during a container loading operation. When a heavily loaded container is being lifted off the ground, its center of gravity is disposed a substantial distance rearwardly of the rear end of the truck chassis. This means that the weight of the container applies a tilting moment to the truck chassis tending to lift the front end of the truck off the ground. The magnitude of this tilting moment is a function not only of the weight of the loaded container but also of the lever arm through which this weight may act. Counteracting this tilting moment is an oppositely directed stabilizing moment set up by the forwardly located masses of the truck itself, such as the truck engine, acting through a lever arm extending rearwardly to the rearmost line of support for the chassis.

If tilting of the truck is to be prevented, it is essential that the stabilizing moment exceed the tilting moment. Yet, a forward shift in the rearmost line of support for the chassis increases the length of the lever arm component of the tilting moment and decreases the lever arm component of the stabilizing moment. Therefore, if stability is to be maintained in spite of this shift, it is necessary either to reduce the pay load, represented by the weight of the loaded container, or to increase the weight of the truck itself. Neither of these alternatives is a satisfactory answer to the problem for obvious reasons.

Accordingly, it is an object of this invention to provide a tandem axle vehicle chassis with means for temporarily shifting the endmost line of support for the chassis from a location midway between the two axles to the location of the endmost axle.

Another object of this invention is to provide a tandem axle truck with a blocking mechanism operable to restrict movement of the truck chassis toward the endmost axle so that the rearmost line of support for the chassis will be located at the endmost axle.

Yet another object of this invention is to provide transporting equipment of the type having a tandem axle truck and a container hoisting mechanism mounted upon the chassis of the truck with means operating automatically each time power is applied to the hoisting mechanism and serving to restrict movement of the truck chassis toward the rear axle of the truck.

A further object of this invention is to provide an axle blocking mechanism for tandem axle vehicles with impositive release means so constructed as to prevent release of the blocking mechanism prior to the removal of the load therefrom.

These objects may be accomplished according to one embodiment of the invention by providing a tandem axle truck with one or more blocking elements pivotally mounted upon the truck chassis immediately above the rear axle for swinging movement back and forth between an active position and an inactive position. In its active position, each blocking element is disposed in alignment with the rear axle and extends vertically so as to limit the distance through which the rear end portion of the chassis may move downwardly toward the rear axle when a load is applied to the rear end of the chassis. As the chassis moves downwardly through this limited distance, the blocking element is brought into contact with a support member carried by the rear axle to prevent further downward movement. After this relationship has been established, the rear axle serves as the rearmost line of support for the truck chassis.

Movements of each blocking element between its active and its inactive positions, are controlled by a hydraulic cylinder and a heavy duty spring. The spring is effective at all times to urge the blocking element towards its inactive position. The hydraulic cylinder, on the other hand, serves to move the blocking element toward its active position, when desired.

In the preferred embodiment of the invention, the hydraulic cylinder is coupled to the hydraulic cylinder of the hoisting mechanism on the truck chassis, so that power is applied to both of these hydraulic cylinders simultaneously. As a result, each time the hoisting mechanism is operated so as to lift a container, the hydraulic cylinder of the axle blocking mechanism also is operated to shift the blocking element to its active position. Then, when pressure is released in the hydraulic cylinder for the hoisting unit, pressure also is released in the hydraulic cylinder for the blocking mechanism, and the spring may return the blocking element to its inactive position unless, at that particular moment, the blocking element is in firm frictional engagement with the support member on the rear axle.

Such a situation might occur, for example, if a heavily loaded container were lowered momentarily onto the extreme rear end portion of the truck chassis, or if a drop-bottom container were being held by a reciprocable carriage during a period when the hoisting mechanism was being lowered to cause dumping of the contents of the container. In these situations, inactivation of the blocking mechanism would occur only after the load on the truck chassis had been removed or redistributed so as to allow the springs of the truck to move the rear end portion of the chassis upwardly far enough to free the blocking element from frictional engagement with the support member on the rear axle. At such time, the spring would return the blocking element to its inactive position, and the load on the truck would be carried by the tandem axles in the normal way.

This embodiment of the invention is illustrated in the accompanying drawings, in which:

FIG. 1 is a side elevation of the transporting equipment having the present invention thereon and showing a loaded container as it is being lifted onto the rear end of the equipment;

FIG. 2 is a side elevation of the transporting equipment showing a loaded container in position to be lowered into its normal carrying position on the truck chassis.

FIG. 3 is a detail transverse cross sectional view taken on a vertical plane located forwardly of the rear axle of the vehicle of FIG. 1 and showing portions of the rear axle blocking mechanism in the positions they occupy during a container-lifting operation;

FIG. 4 is a detail longitudinal cross sectional view of the blocking mechanism as seen from the right of FIG. 3;

Figure 5:
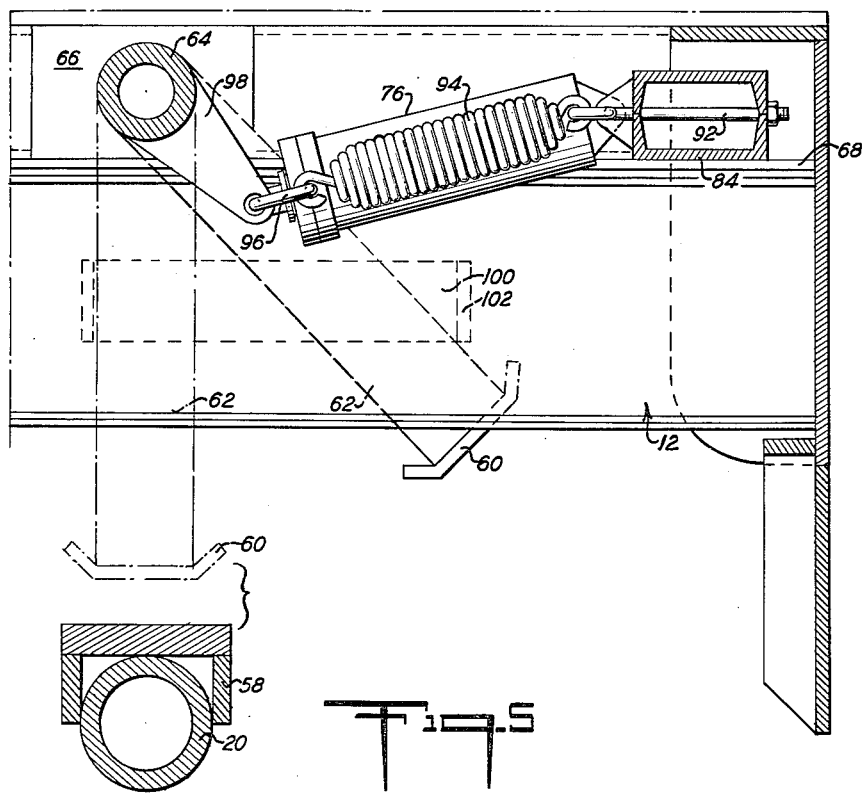
FIG. 5 is a somewhat similar longitudinal cross sectional view of the blocking mechanism, but it illustrates the inactive positions of the parts and also shows spring means for urging the parts to their inactive positions.

As illustrated, the invention is applied to a truck 10 having a chassis 12 supported at its front end by wheels 14 and supported at its rear end by wheels 15 of a conventional tandem axle construction designated generally by the numeral 16. The tandem axle construction 16 includes a forward axle 18 and a rear axle 20, each bearing depending link elements 22 pivotally connected to the ends of walking beams 24. Pintles or pivot elements 26 pivotally connect the central portion of each walking beam to an upstanding bracket member 28 fixed to a leaf spring unit 30 carried in the usual way by brackets 32 and 34 on the truck chassis 12. With this construction, it will be observed that the normal rearmost line of support for the truck chassis 12 is the line connecting the pivot elements 26 which serve to transmit the weight of the chassis 12 from the depending bracket members 28 on the spring units 30 to the central portions of the walking beams 24. This results in a distribution of the weight between the two axles 18 and 20.

The hoisting unit mounted upon the truck chassis 12 is of a character disclosed more fully in the aforesaid patents, No. Re. 23,546 and No. 2,800,233. The unit includes a frame or base 36 rigidly connected to the truck chassis 12, a carriage 38 mounted for longitudinal reciprocating movements along the base 36, and an elevator unit on the carriage 38. The elevator unit includes a vertically movable framework 40, a portion of which is visible in FIG. 2, a guide wheel 42 rotatably mounted upon the framework 40 adjacent each lateral edge of the unit, and one or more hydraulic cylinders 44 fixed at their lower ends to the carriage 38 and having piston rods 46 protruding from their upper ends and being connected to the framework 40. A flexible element 48, such as a cable or a chain, cooperates with each of the guide wheels 42. Each flexible element 48 is attached at one of its ends to the carriage 38 by suitable means 50, passes over a guide wheel 42, and is connected releasably at its opposite end to a lifting pin 52 on a container 54.

Although the container 54 illustrated in the drawings, is of the bottom discharge type and has its lifting pins 52 mounted upon side wings on the container bottom so as to permit dumping of the contents of the container, it will be apparent to persons skilled in the art that other types of containers also may be employed.

When it is desired to load a container 54 onto the truck 10, the truck 10 is maneuvered into a position immediately in front of the container 54, the flexible elements 48 are connected to the pins 52 at the ends of the container 54, and the hydraulic cylinders 44 are actuated to move the guide wheels 42 upwardly. As the guide wheels 42 move upwardly, the container 54 is lifted off the ground and moved upwardly along skids 56 fixed to the rear end portion of the base 36 and along the rear face of the carriage 38. When the container has been brought to a height above the base 36, movement of the piston rods 46 may be stopped, and the carriage 38 may be moved forwardly along the base 36 to bring the loaded container 54 to a forward position with respect to the base 36. This is the position of the parts illustrated in FIG. 2 of the drawings. Thereafter, the container 54 may be lowered onto the base 36 so as to occupy a suitable position for support by the truck 10 during movements of the truck from one place to another. This position of the container 54 is commonly referred to as the "carrying position."

The structure just described is conventional in the art. The blocking mechanism of this invention now will be described in detail with reference to FIGS. 3, 4 and 5 of the drawings.

Each end portion of the rear axle 20 carries a conventional pillow block 58 which may be engaged by a foot 60 on the lower end of a blocking element 62 illustrated as a tubular member. It will be understood that there are two of the blocking elements 62, and that each of these elements is disposed above an end portion of the rear axle 20. The blocking elements 62 must be sufficiently rigid to transmit substantial loads from the truck chassis to the rear axle 20.

The upper end portion of each of the blocking elements 62 is fixed to a transversely extending shaft 64 mounted in suitable bearings 66. It is preferred that each of the bearings 66 be welded along its lower edge to a fish-plate member 68 which constitutes a part of the truck chassis 12 and also welded at its upper edge to a subframe member 70 which constitutes a part of the base 36. The shaft 64 is freely rotatable in the bearings 66, but is prevented from endwise movement relative thereto by suitable collars 72 fixed to the shaft 64 immediately adjacent the innermost faces of the bearings 66. As the shaft 64 is turned about its axis, the blocking elements 62 swing back and forth between the two positions illustrated in FIG. 5 of the drawings.

The rotary movements of the shaft 64 are controlled by a hydraulic cylinder 76 having an inlet line or conduit 78 and an outlet line or conduit 80 for hydraulic fluid. These conduits are illustrated in FIG. 4, but they have been omitted from the other views in the interest of clarity. The rear end of the hydraulic cylinder 76 is pivotally connected at 82 to a rigid, transversely extending member 84 welded or otherwise secured to the truck chassis 12. A piston rod 86 protrudes from the front end of the hydraulic cylinder 76 and is pivotally connected at 88 to a pair of depending arms or cranks 90 fixed rigidly to the shaft 64.

As shown in FIG. 5, the rigid member 84 extending transversely across the rear end of the chassis 12 also carries a bolt 92 to the forward end of which is pivotally connected a heavy duty coil spring 94. The front end of the spring 94 is connected by a ring member 96 to a depending arm or crank 98 fixed rigidly to the shaft 64. Although the arms 90 connected with the piston rod 86 of the hydraulic cylinder 76 have been shown as separate elements from the arm 98 connected with the spring 94, it will be apparent that both the spring 94 and the piston rod 86 may be connected to the same arms, if desired. It is desirable only that the shaft 64 be controlled by both the spring 94 and the hydraulic cylinder 76.

In order that each of the blocking elements 62 may be guided for movement in a vertical plane as it swings back and forth between the two positions suggested in FIG. 5, each of the fish plates 68 has secured thereto an elongated C-shaped guide member 100. Each guide member 100 forms a longitudinal channel through which a blocking element 62 may swing between its inactive and its active positions. From FIG. 5 it will be observed that the rearmost end wall 102 of the guide member 100 also serves as a stop or abutment against which the blocking element 62 may be urged by the spring 94. Hence, the position of the end wall 102 determines the inactive position of the blocking element 62.

The active position of each blocking element 62 is a vertical position, in which the blocking element 62 extends along a vertical line between the shaft 64 and the rearmost axle 20. This position preferably is established by so locating the rigid mounting member 84 for the rear end of the hydraulic cylinder 76 that a full stroke of the piston rod 86 will cause the blocking element 62 to swing forwardly from its inactive position adjacent the rear end wall 102 of the stationary guide 100 to a vertical position directly below the shaft 64. When the piston rod 86 reaches the desired position, the piston is stopped by the end wall of the cylinder 76 and remains in this condition until the pressure of the hydraulic fluid in the inlet line 78 is relieved. After the pressure has been relieved, the spring 94 becomes operative to swing the shaft 64 in the reverse direction.

Figure 6:
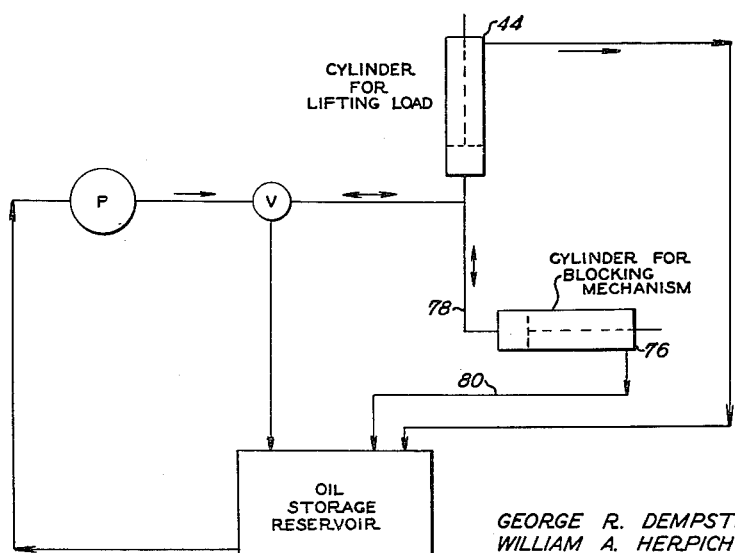
FIG. 6 is a flow diagram of the hydraulic system for actuating the blocking mechanism automatically in response to actuation of the hoisting unit on the truck.

When the invention is utilized in connection with container-handling equipment of the type shown in FIGS. 1 and 2, it is preferred that the high pressure inlet line 78 for the cylinder 76 of the blocking mechanism be coupled to the high pressure line serving the hoisting cylinder 44 so as to assure proper coordination between the hoist and the blocking mechanism. Such an arrangement is illustrated diagrammatically in FIG. 6. Hydraulic fluid passes from an oil storage reservoir through a pump P to a suitable control valve V, which may be manipulated to direct the flow either back to the reservoir or to the cylinders 44 and 76. When the cylinders 44 and 76 are to be actuated, the valve V directs the flow from the pump to the high pressure inlet lines for the cylinders, and both cylinders are actuated simultaneously. The discharge lines for the cylinders 44 and 76 are both connected to the oil storage reservoir.

The length of the blocking elements 62 is a function of the vertical distances between the rearmost axle 20 and the transverse shaft 64 under different loading conditions. When the rear end portion of the truck chassis 12 is subjected to heavy loads, the blocking elements 62 must be long enough to contact the pillow blocks 58 on the rear axle 20 so that these loads will be transmitted directly to the rear axle 20. This condition is suggested in FIGS. 1 and 4. However, after the load on the extreme rear end portion of the chassis 12 has been relieved, as by shifting the load forwardly or releasing the load, the foot 60 on the lower end of each blocking element 62 should be spaced far enough above its pillow block 58 to permit swinging of the blocking elements 62 to their inactive positions. This condition is illustrated in FIGS. 2 and 5.

With these criteria in mind, the length of the blocking elements 62 for a particular installation can be determined readily. Either measurements or computations may be utilized by the designer to determine the distance between the shaft 64 and the rearmost axle 20 under load conditions of such a nature that tipping of the truck is imminent, and then a length for the blocking elements 62 may be selected. The selected length should be great enough to prevent the shaft 64 from approaching the rearmost axle 20 any closer than the distance determined by the computations or measurements. Under normal load conditions where there is no likelihood that the truck will tilt, the springs 30 will be effective to lift the chassis 12 with respect to the rearmost axle 20, and the desired spacing between the foot 60 on the blocking elements 62 and the pillow block 58 will be established automatically.

The operation of the blocking mechanism now will be apparent. Let it be assumed initially that a heavily loaded container 54 is to be lifted onto the truck 10 of FIGS. 1 and 2 for movement to some remote location. In order to get the container 54 into its normal carrying position, it must be lifted vertically, shifted forwardly along the truck chassis, and then lowered onto the chassis.

During the lifting of the container 54, the truck chassis 12 must bear heavy loads located rearwardly of pintles 26 connecting the springs 30 to the walking beams 24. If there were no blocking mechanism, the truck chassis 12 would be subjected to a tilting moment tending to swing the front end of the truck upwardly about the pintles 26. Such moment would be equal to the product of the load due to all of the weights located rearwardly of the pintles 26 times the horizontal distance between the pintles 26 and the center of gravity of this load. However, utilization of the blocking mechanism of this invention results in a material reduction in the magnitude of the tilting moment, because the blocking mechanism serves to shift the rearmost line of support for the truck chassis 12 from the pintles 26 to the rear axle 20. The rearward shift in the line of support for the vehicle chassis 12 reduces the lever arm through which the rearwardly located weights may act, and, at the same time, increases the lever arm through which the forwardly located weights, such as the truck engine, may act in opposition to the tilting moment imparted by the load.

Moreover, it will be observed that this beneficial result is brought about automatically without requiring any action on the part of the operator of the equipment. When the hydraulic cylinder 44 of the hoisting mechanism is actuated, oil begins to flow immediately into the hydraulic cylinder 76 of the blocking mechanism through the high pressure inlet line 78. This flow causes the piston rod 86 to move through a full stroke to swing the blocking elements 62 into their vertical positions. The feet 60 on the blocking elements 62 then contact the pillow blocks 58 on the rear axle 20 as soon as the load on the chassis 12 becomes great enough to deflect the springs 30 and shift the shaft 64 downwardly toward the rear axle 20.

The blocking elements 62 remain in their vertical positions as long as the hydraulic cylinder 44 of the hoisting mechanism is activated. Therefore, the blocking mechanism will be effective for as long as it is needed to prevent tilting of the vehicle. After the loaded container 54 has been lifted to the desired level, the carriage 38 moves forwardly along the base 36 mounted upon the vehicle chassis 12. During this forward movement, the weight imposed upon the chassis 12 shifts so that the lever arm for the tilting moment is first reduced and then disappears entirely. Therefore, at some point, the pivot-shifting effect of the blocking mechanism becomes unnecessary, but the operator need not make any determination as to when this point is reached, because the blocking mechanism automatically becomes ineffective after the load has been shifted sufficiently to allow the springs 30 to lift the rear end of the chassis 12.

When the container 54 has reached its forwardmost position, as indicated in FIG. 2, the cylinder 44 is collapsed to lower the container 54 onto the truck chassis 12, and the hydraulic cylinder 76 of the blocking mechanism also is collapsed automatically. The heavy duty spring 94 then becomes operative to swing the blocking elements 62 to their inoperative positions adjacent the end walls 102 of the guides 100. In their inactive positions, the blocking elements 62 are spaced far enough away from the rear axle 20 to prevent any interference with the normal action of the springs 30 as the truck 10 is moved from place to place.

At such time as it becomes necessary to discharge the container 54 or to dump its contents, the blocking mechanism is automatically reactivated in response to activation of the cylinder 44 of the hoisting unit. Therefore, when the container 54 is shifted rearwardly to the rear end of the chassis 12, the blocking elements 62 will be in position to engage the pillow blocks 58 as required in order to prevent tilting of the truck 10.

If the container 54 is to be dumped, the spring 94 of the blocking mechanism takes on a special significance. As explained in the patents mentioned above, dumping is accomplished by moving the carriage 38 to the rear end of the base 36, supporting the container 54 upon a hook (not shown) mounted on the carriage 38, and collapsing the hydraulic cylinder 44 of the hoisting unit to permit the bottom of the container 54 to swing downwardly with respect to the side walls of the container 54. Hence, it will be observed that the hydraulic cylinder 44 of the hoisting unit is collapsed at a time when the load is disposed rearwardly of the pintles 26. It obviously is desirable that the blocking mechanism of this invention remain effective under these conditions, and the impositive return action of the spring 94 permits this result to be otbained.

If the cylinder 76 is collapsed at a moment when the feet 60 on the blocking elements 62 are in engagement with the pillow blocks 58 on the rear axle 20, the blocking elements 62 will be held in their active positions by the pillow blocks 58 themselves. The spring 94 becomes effective to return the blocking elements 62 to their inactive positions only after the shaft 64 has moved upwardly away from the rear axle 20 a sufficient distance to allow the feet 60 on the lower ends of the blocking elements 62 to clear the pillow blocks 58.

Although a single embodiment of the invention has been illustrated and described in detail, various changes and modifications will suggest themselves to persons skilled in the art. It is intended, therefore, that the foregoing description be considered as exemplary only, and that the scope of this invention be ascertained from the following claims.

We claim:

1. In a vehicle having a pair of axles, wheels on said axles, means connected to and extending between said axles, and a chassis operatively connected to said means at a location between said axles, the improvement which comprises a rigid axle blocking member mounted on said chassis for swinging movements about a horizontal axis directly above one of said axles between a vertical active position and an inclined inactive position, a guide on said chassis for confining said blocking member to movements in a vertical plane, an abutment on said chassis for contacting said blocking member in the inactive position thereof to prevent movement of said blocking member beyond said inactive position, a spring mounted on said chassis and operatively connected to said blocking member for urging said blocking member into contact with said abutment, and a hydraulic device mounted on said chassis and operatively connected to said member for moving said member against the bias of said spring from its inactive position to its active position.

2. In equipment of the type having a vehicle chassis, support means at one end portion of said chassis, a pair of transverse axles below the opposite end portion of said chassis, wheels on said axles, connecting means connected to and extending between said axles, spring means connected to said chassis and connected to said connecting means at a location between said axles, lifting means on said chassis for lifting loads disposed adjacent said opposite end portion of said chassis, a hydraulic cylinder on said chassis for actuating said lifting means, and means for supplying hydraulic fluid under pressure to said cylinder, the improvement which comprises a transversely extending shaft rotatably mounted on said chassis directly above the endmost of said axles, a pair of rigid axle blocking members each fixed to an end portion of said shaft so that each blocking member swings in a vertical plane as said shaft is moved about its axis, a crank fixed to a central portion of said shaft, a hydraulic device mounted on said chassis and connected to said crank for rotating said shaft between a first position in which said blocking members are inclined with respect to the vertical direction and a second position in which said blocking members extend vertically toward said endmost axle, and conduit means connected to said device and to said means for supplying fluid to the hydraulic cylinder for said lifting means so that said hydraulic cylinder and said hydraulic device are actuated simultaneously.

3. In transporting and dumping equipment of the type having a vehicle chassis, support means at one end portion of said chassis, a pair of transverse axles below the opposite end portion of said chassis, wheels on said axles, connecting means connected to and extending between said axles, spring means connected to said chassis and connected to said connecting means at a location between said axles, a carriage mounted on said chassis for longitudinal reciprocation over said axles, and a hydraulically operated hoisting mechanism carried by said chassis for manipulating detachable containers with respect to said carriage and said chassis so as to cause the containers to be loaded onto said opposite end portion of the chassis or unloaded from said opposite end portion of the chassis or dumped while located at said opposite end portion of the chassis, the improvement which comprises a rigid axle blocking member mounted on said chassis for swinging movements about a horizontal axis directly above the endmost of said axles between a vertical active position and an inclined inactive position, an abutment fixed to said chassis for preventing movement of said blocking member beyond its inactive position, spring means mounted on said chassis and operatively connected to said blocking member for urging said blocking member toward said abutment, a hydraulic device mounted on said chassis and operatively connected to said blocking member for moving said blocking member from its inactive position to its active position against the bias of said spring, and conduit means innerconnecting said hoisting mechanism and said device so that said device is actuated automatically upon actuation of said hoisting mechanism.

References Cited in the file of this patent

UNITED STATES PATENTS

| | | |
|---|---|---|
| Re. 23,546 | Dempster | Sept. 9, 1952 |
| 780,201 | Knox | Jan. 17, 1905 |
| 1,350,992 | Downie | Aug. 24, 1920 |
| 1,581,358 | Mayer | Apr. 20, 1926 |
| 1,767,470 | Mitchell | June 24, 1930 |
| 2,400,803 | Barnhart | May 21, 1946 |
| 2,439,085 | Grzech et al. | Apr. 6, 1948 |
| 2,599,043 | Bissel | June 3, 1952 |
| 2,740,538 | Felkner | Apr. 3, 1956 |
| 2,870,924 | Wills | Jan. 27, 1959 |

FOREIGN PATENTS

| | | |
|---|---|---|
| 474,059 | Germany | Apr. 22, 1928 |
| 560,641 | Canada | July 22, 1958 |